June 23, 1959  E. LEVENS ET AL  2,891,993
FORMATION OF BORON ACETATE BY THE REACTION OF
ACETIC ANHYDRIDE WITH BORIC ACID
Filed Nov. 12, 1957
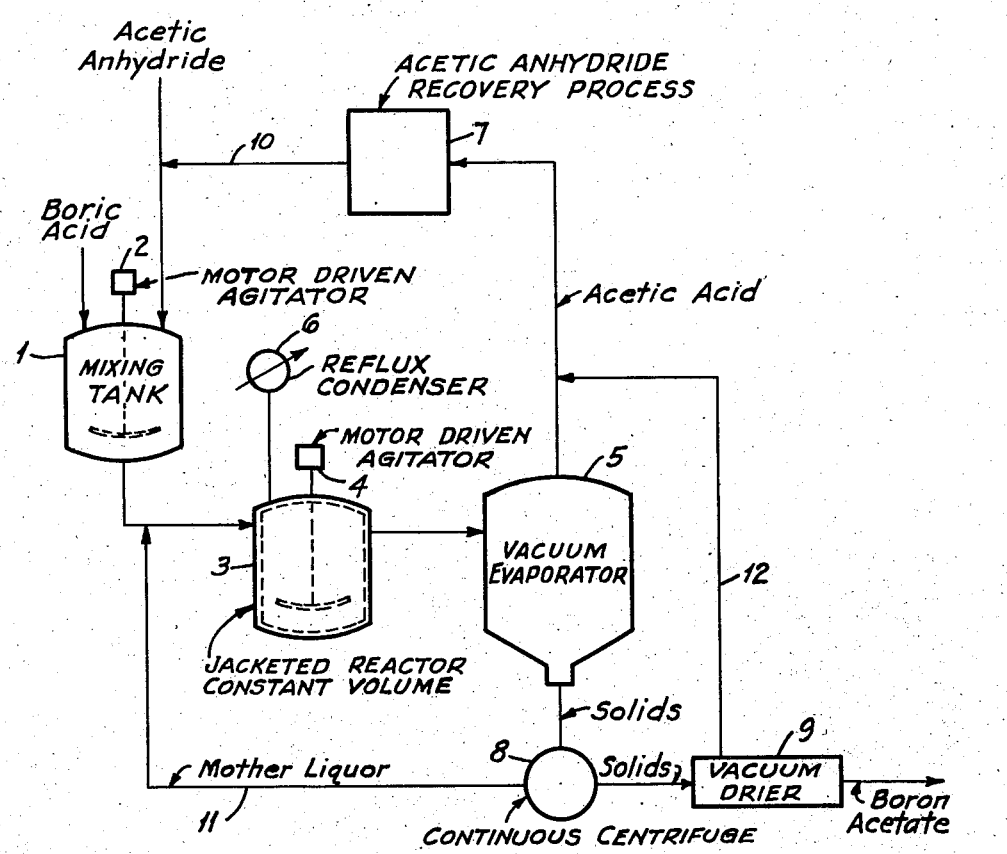
INVENTORS
Ernest Levens
Robert M. Washburn
ECKHOFF & SLICK
ATTORNEYS
BY
A MEMBER OF THE FIRM

United States Patent Office 2,891,993
Patented June 23, 1959

2,891,993

FORMATION OF BORON ACETATE BY THE REACTION OF ACETIC ANHYDRIDE WITH BORIC ACID

Ernest Levens and Robert M. Washburn, Whittier, Calif., assignors to American Potash & Chemical Corporation, a corporation of Delaware Application November 12, 1957, Serial No. 695,973

10 Claims. (Cl. 260—545)

This invention relates to a continuous process for making boron acetate.

The mixed anhydride of boric acid and acetic anhydride, which we prefer to call boron acetate, has been known for some time. Pictet and Geleznoff [Berichte, 36, 2219 (1903)] described the compound, which they called "boron triacetate," as broad, hygroscopic needles, melting at 121° C. Subsequently, Dimroth [Annalen, 446, 97–122 (1925)] claimed the compound was not the triacetate, $(CH_3COO)_3B$, but rather was the "pyroboroacetate," $(CH_3COO)_2BOB(OOCCH_3)_2$, melting at 150–152° C. Details of the controversy about the actual structure of boron acetate may be found in several publications. It is our belief, although we do not wish to be limited thereto, that the compound is the tetra-acetoxyboric anhydride (or "pyroboroacetate") described by Dimroth, since: The analyses correspond to those calculated for this structure; we invariably obtain an acetate to boron molar ratio of two to one; there is an infrared absorption maximum at the wave length calculated for —B—O—B— absorption (8.4 microns); and the Karl Fischer reagent, which reacts quantitatively with any boron bond capable of forming methyl borate with the reagent and liberating water, shows one mol of such reactive boron bond per mol of boron acetate.

Whatever may be the structure of the material we term boron acetate, it is well known that it may be made by the reaction of acetic anhydride with orthoboric acid or boric anhydride. We have also found that metaboric acid may be used as the source of boron with excellent results. The procedure customarily employed is to heat a batch of the acetic anhydride and solid boron compound in a suitable vessel until reaction and solution occur, then cool the reaction mixture and collect the precipitated boron acetate. When this method is used with orthoboric acid, it is necessary to heat the reaction vessel with extreme care, since the reaction becomes violently exothermic at 60–70° C. and creates a hazardous condition. We have found that the reaction with metaboric acid becomes exothermic at about 135° C. The reaction with boric anhydride proceeds without the apparent evolution of heat, but takes longer to complete and gives a highly discolored product.

In accordance with the present invention, we have found that boron acetate can be prepared quickly, inexpensively, in high yield and of excellent purity by the continuous process described herein with elimination of the hazards inherent in the batch operation. It will be apparent that our process can also be operated on a batch, or on a semi-continuous basis, but we prefer to operate it continuously although we do not wish to be limited thereto. Our new method involves the introduction of a substantially unreacted mixture of acetic anhydride, orthoboric acid and metaboric acid or a mixture of these into a hot reaction zone at a controlled rate, and the subsequent separation of the products of reaction, boron acetate and acetic acid.

It is in general the broad object of the present invention to provide an improved continuous process for the manufacture of boron acetate.

Another object of the present invention is to provide a process for the manufacture of boron acetate directly by reaction of acetic anhydride with a boron source such as orthoboric acid, metaboric acid and mixtures thereof.

In the drawing accompanying and forming a part hereof, we have shown a simplified apparatus set-up in schematic form, and a flow diagram which can be utilized for the production of boron acetate.

Referring to the drawing, the acetic anhydride and boron source, e.g., orthoboric acid, metaboric acid, nor a mixture, are metered into tank 1, which is equipped with an agitator 2. The well-mixed slurry is passed at a controlled rate into a constant-volume, jacketed reactor 3 equipped with an agitator 4, and a reflux condenser 6. The slurry is introduced at such a rate that the reaction proceeds smoothly. The clear solution from reactor 3, now a mixture of boron acetate and acetic acid, flows to the vacuum evaporator 5. The acetic acid which is stripped from the boron acetate may be discarded, or it may proceed to any convenient process 7 for conversion to acetic anhydride, when it may be recycled to the process through line 10. In place of a slurry, one can add the acetic anhydride and boron source separately.

The boron acetate from evaporator 5, which is more or less wet with acetic acid, is passed into a continuous centrifuge 8, from which it is sent to a vacuum drier 9. The mother liquor from the centrifuge 8 is recycled to the reactor 3 through line 11, while the acetic acid recovered from the drier 9 is sent to the acetic anhydride recovery process 7 through line 12.

When orthoboric acid is used as the boron source, reactor 3 is heated to about 70–80° C. to start the reaction when the process is first put into operation; in that case, a small heel of glacial acetic acid, or acetic anhydride, in the reactor may assist in providing good thermal contact, although merely heating the air in the reactor to the appropriate temperature will suffice. Once initiated, the reaction with orthoboric acid will be self-propagating and the rate at which it proceeds is easily controlled by the rate of addition of the acetic anhydride-orthoboric acid slurry from mixing tank 1. The temperature is ordinarily kept substantially constant and below 118° C,. the boiling point of acetic acid, and between 70° C. and the temperature of reflux, e.g., 115–118° C. The rate of addition of the reactants is such that the heat liberated by the reaction is equal to the total heat lost from the reaction zone.

When metaboric acid is used, the reaction is similarly self-propagating at about 135° C., although in this case the by-product, acetic acid, boiling at 118° C., must be rapidly removed from the reaction zone so as not to reduce the temperature substantially below the boiling point of acetic anhydride at 140° C.

Our invention having been thus described, a number of modifications will be apparent to those skilled in the art. For example, acetic acid may be removed from the vacuum evaporator under such conditions as to limit the temperature in the evaporator to some temperature above that at which acetic anhydride and orthoboric acid react, as 70–80° C. In such a case, it will be obvious that unreacted acetic anhydride and orthoboric acid, either mixed or as separate streams, may be admitted to the evaporator for reaction without requiring the use of a separate reaction tank. Also, it is apparent that the boron acetate obtained may be treated in various ways, such as repulping in petroleum ether followed by filtration, or centrifuging and drying. If a separate reactor is used, the product therefrom may be sent directly to a crystallizer, from which the boron acetate may be recovered by filtration or centrifuging, while the mother liquors are treated with a non-solvent for boron acetate, such as petroleum ether, to recover a second crop of crystals. None of these modifications limits the usefulness of our process in any way.

The manner of applying our process to the preparation of boron acetate may be seen from the examples herein given, but it will be understood that we do not wish to be limited thereto, they being only illustrative of the general utility of our method.

*Example 1.*—In an apparatus as described, a well-stirred slurry of orthoboric acid and acetic anhydride was added at room temperature at the rate of 1113 grams (18 mols) orthoboric acid and 5653.8 grams (54 mols) acetic anhydride per hour. Initially, the addition was made to a heel of 1,000 ml. of glacial acetic acid, which had been preheated to 100° C. in vessel 3. The rate of addition was such that the reaction temperature remained between 90° and 110° C.; the mass in the reaction vessel is relatively large in comparison to the mass of the unreacted boric acid and acetic anhydride present and reacting at any instant. The temperature of the reaction can therefore be maintained in a range whereat the reaction proceeds smoothly, for the liquid content of vessel 3 serves as a coolant in the process.

The initial acetic acid heel was soon replaced by an equilibrium mixture of acetic acid, boric acid, acetic anhydride and boron acetate. The reaction mixture was removed continuously from vessel 3 at a rate corresponding to the rate of addition of the reactants. The boron acetate-acetic acid reaction mixture was separated, acetic acid being removed continuously under vacuum in evaporator 5 from the clear reaction mixture. The residue was dried at 40–50° C. at 1–2 mm. Hg; the yield of boron acetate was 2307 grams (93.5%) per hour. The product contained 7.72% boron and 86.3% acetate and, based on acetate content, had a purity of 100.1%.

*Example 2.*—In an apparatus set-up as in Example 1, but of larger size, a well-stirred slurry of orthoboric acid and acetic anhydride was added at the rate of 5008.5 grams (81 mols) orthoboric acid and 25,443 grams (243 mols) acetic anhydride per hour at room temperature. As in Example 1, the initial addition was made to a heel of 750 ml. glacial acetic acid pre-heated to 110° C. The mixture was added at such a rate that the reaction temperature remained between 95° and 115° C. The acetic acid was stripped from the reaction mixture in evaporator 5 and the residue was dried at 40–50° C. at 1–2 mm. Hg. The yield of boron acetate was 96.5%, calculated as tetracetoxyboric anhydride. The product contained 7.82% boron and 86.6% acetate and, based on acetate content, had a purity of 100.4%.

*Example 3.*—In an apparatus set-up as was used in Example 1, but of larger size, the reaction of 6644 grams 107.25 mols) orthoboric acid with 30,173 grams (295.9 mols) acetic anhydride per hour, gave 13,871 grams of boron acetate per hour (94.2% yield). All but 1.6% of the theoretical amount of acetic acid was recovered. The observed loss of 5.8% of the expected amount of boron acetate was attributed to transfer losses while handling the product in an inert atmosphere box during the drying and packaging steps.

*Example 4.*—In the same apparatus as was used in Example 3, a stream of metaboric acid and a stream of acetic anhydride were added at the rate per hour of 5786 grams (132 mols) of metaboric acid ($HBO_2$) and 21,670 grams (212.3 mols) of acetic anhydride at room temperature. In this case, the initial addition was made to a heel of 550 ml. of acetic anhydride preheated to 135° C. The reaction temperature remained at approximately 138° C., the heat of reaction liberated as the process was carried on being equal at this temperature to the rate of heat lost to the atmosphere from the reaction vessel. A portion of the mixture was removed continuously from the reactor and acetic acid was stripped from the removed portion and the residue dried at 40–50° C. at 1–2 mm. Hg. The yield of boron acetate was 17,248 grams (95.3%) per hour. The product contained 7.86% boron and 86.4% acetate and, based on acetate content, had a purity of 100.1%.

*Example 5.*—The procedure of Examples 1–4 was followed except that the heel in vessel 3 was the equilibrium mixture from a previous run under the conditions of the repeated example. The same results were obtained.

Operation is also possible, as the following examples demonstrate, wherein the addition is made in small equal increments and at uniform time intervals:

*Example 6.*—In an apparatus of the type described in Example 1, the component parts of which were made of borosilicate glass, a well-stirred slurry at room temperature of 556.5 grams (9 mols) orthoboric acid and 2826.9 grams (27 mols) acetic anhydride was added in small increments to a heel of 500 ml. of glacial acetic acid, which had been preheated to 100° C. at such a rate that the reaction temperature remained between 90° and 110° C. When the acetic acid was removed under vacuum from the resulting clear reaction mixture, the residue dried at 40–50° C. at 1–2 mm. Hg, the yield of boron acetate was 1153.5 grams (93.5%). The product contained 7.72% boron and 86.3% acetate and, based on acetate content, had a purity of 100.1%.

*Example 7.*—In the same apparatus as was described in Example 2, a well-stirred slurry of 3339 grams (54 mols) orthoboric acid and 16,962 grams (162 mols) acetic anhydride at room temperature was added in small increments to a heel of 500 ml. of glacial acetic acid preheated to 110° C. at such a rate that the reaction temperature remained between 95° and 115° C. The acetic acid was stripped from the reaction mixture and the residue dried at 40–50° C. at 1–2 mm. Hg. The yield of boron acetate was 96.5% calculated as tetracetoxyboric anhydride. The product contained 7.82% boron and 86.6% acetate and, based on acetate content, had a purity of 100.4%.

*Example 8.*—In the same apparatus as was described in Example 2 and in the manner described in Example 6, the reaction of 6040 grams (97.5 mols) orthoboric acid with 27,430 grams (269 mols) acetic anhydride, gave 12,610 grams boron acetate (94.2% yield). All but 1.6% of the theoretical amount of acetic acid was recovered. The observed loss of 5.8% of the expected amount of boron acetate was attributed to transfer losses while handling the product in an inert atmosphere box during the drying and packaging steps.

*Example 9.*—In the same apparatus as was described in Example 2, a well-stirred slurry of 5260 grams (120 mols) of metaboric acid ($HBO_2$) and 19,700 grams (193 mols) of acetic anhydride at room temperature was added in small increments to a heel of 500 ml. of acetic anhydride which had been preheated to 135° C., at such a rate that the reaction temperature remained at approximately 138° C. The hot, clear reacted mixture was removed from the reactor as rapidly as possible so as not to reduce the reaction temperature. The acetic acid was stripped from the reaction mixture and the residue dried at 40–50° C. at 1–2 mm. Hg. The yield of boron acetate was 15,680 grams (95.3%). The product contained 7.86% boron and 86.4% acetate and, based on acetate content, had a purity of 100.1%.

*Example 10.*—In an apparatus set-up made of borosilicate glass as in Example 6, a well-stirred slurry at room temperature in the proportion of 556.5 grams (9 mols) orthoboric acid and 2826.9 grams (27 mols) acetic anhydride was added in small increments to a heel of 500 ml. from a previous run. The heel had been preheated to 100° C. The mixture was added continuously but at such a rate that the reaction temperature remained between 90° and 110° C. Periodically the reaction mixture was removed and the acetic acid separated under vacuum from the reaction mixture. The residue was dried at 40–50° C. at 1–2 mm. Hg. The product contained 7.72% boron and 86.3% acetate and, based on acetate content, had a purity of 100.1%.

*Example 11.*—In the apparatus as was used in Example 2, a well-stirred slurry of 3339 grams (54 mols) orthoboric acid and 16,962 grams (162 mols) acetic anhydride at room temperature was added in small equal increments to a heel of 500 ml. glacial acetic acid preheated to 110° C. The rate of addition was such that the reaction temperature remained between 95° and 115° C. under the atmospheric conditions existing about the reactor. The acetic acid was stripped from the reaction mixture and the residue dried at 40–50° C. at 1–2 mm. Hg. The product contained 7.82% boron and 86.6% acetate and, based on acetate content, had a purity of 100.4%.

*Example 12.*—In the same apparatus as was used in Example 2 and using a heel of reaction product from an earlier run, the reaction of a total 6040 grams (97.5 mols) orthoboric acid with 27,430 grams (269 mols) acetic anhydride, added to the heel in small equal increments over a period of two hours, gave 12,610 grams boron acetate (94.2% yield).

*Example 13.*—In the same apparatus as was used in Example 2, a well-stirred slurry of 5260 grams (120 mols) of metaboric acid ($HBO_2$) and 19,700 grams (193 mols) of acetic anhydride at room temperature was added to a 500 ml. heel of acetic anhydride which had been preheated to 135° C., in such small increments and at such a rate that the reaction temperature remained at approximately 138° C. during a three hour operating period. A stream of hot, clear reacted mixture was removed continuously from the reactor. The acetic acid was stripped from the reaction mixture and the residue dried at 40–50° C. at 1–2 mm. Hg. The total yield of boron acetate was 15,680 grams (95.3%). The product contained 7.86% boron and 86.4% acetate and, based on acetate content, had a purity of 100.1%.

*Example 14.*—In an operation as in Example 1, the boron acetate can be precipitated from the mother liquor by addition of petroleum ether or other hydrocarbon which is not a solvent. The solids are then recovered by filtration or centrifuging and dried. The petroleum ether-acetic acid mother liquor can be separated into its components by distillation and the petroleum ether fraction recycled and crystallized, while the acetic acid is sent to a recovery process for conversion to acetic anhydride. More particularly, the reaction mixture removed from vessel 3 was cooled in a continuous crystallizer, to which was added petroleum ether. The resulting slurry was then passed to a centrifuge and the solids vacuum-dried. The mother liquor was sent to a flash evaporator and the bottoms (boron acetate and acetic acid) were recycled to reactor 3 and the overhead vapors fractionally continuously distilled; the light fraction, petroleum ether, was recycled to the crystallizer; the heavy fraction of acetic acid was recycled to recovery process 7.

From the foregoing, we believe it will be apparent that we have provided a novel, simple and improved process for the manufacture of boron acetate in such manner that the reaction can be controlled and carried on continuously. In each instance, that is, whether the process be carried on continuously or on batch lines, the cold mixture of boric acid and acetic anhydride is added to a hot mass of what is essentially an equilibrium mixture of boron acetate, acetic acid and the reactants. The rate of heat removed from the reaction zone is equal to the heat of reaction liberated whereby the reaction proceeds smoothly and the reaction zone remains constantly at a temperature conducive to good operation.

This is a continuation-in-part of application Serial No. 514,292, filed June 9, 1955 and now abandoned.

We claim:

1. A continuous process for the manufacture of boron acetate comprising: maintaining a liquid mass of boron acetate and acetic acid in a reaction zone; introducing into said zone acetic anhydride and orthoboric acid in at least about a 5:2 molar ratio, the rate of introduction of said acetic anhydride and said orthoboric acid being such that the temperature of the liquid mass is maintained between about 70° C. and 118° C. and below the temperature of reflux of the mixture so formed; continuously withdrawing a stream comprising boron acetate and acetic acid from said zone; and recovering the boron acetate from the withdrawn stream.

2. The process of claim 1 wherein the acetic anhydride and the orthoboric acid are admitted to the reaction zone as a cold slurry.

3. The process of claim 1 wherein the temperature is maintained at between about 70° C. and 115° C.

4. The process of claim 2 wherein the temperature is maintained at between about 70° C. and about 115° C.

5. A continuous process for the manufacture of boron acetate comprising: maintaining a liquid mass of boron acetate and acetic acid in a reaction zone at a temperature within the range of about 70° C.–118° C.; continuously introducing into said zone acetic anhydride and orthoboric acid in about a 5:2 molar ratio; the rate of introduction of the acetic acid and said orthoboric acid being such that the temperature of the liquid mass in said reaction zone is maintained to within the range of 70° C.–118° C. and below the temperature of reflux of said mixture; withdrawing boron acetate and acetic acid from said zone and recovering the withdrawn boron acetate.

6. A continuous process for the manufacture of boron acetate comprising: maintaining a liquid mass of boron acetate and acetic acid in a reaction zone; introducing into said zone acetic anhydride and metaboric acid in at least about a 3:2 molar ratio; the rate of introduction of said acetic anhydride and said metaboric acid being such that the temperature of the liquid mass is maintained between about 135° C. and 140° C. and below the temperature of reflux of the mixture so formed; continuously withdrawing a stream comprising boron acetate and acetic acid from said zone; and recovering the boron acetate from said withdrawn stream.

7. The process of claim 6 wherein the acetic anhydride and the metaboric acid are admitted to the reaction zone as a cold slurry.

8. The process of claim 6 wherein the temperature is maintained at about 138° C.

9. The process of claim 7 wherein the temperature is maintained at about 138° C.

10. A continuous process for the manufacture of boron acetate comprising: maintaining a liquid mass of boron acetate and acetic acid in a reaction zone at a temperature within the range of about 135° C. and 140° C.; continuously introducing into said zone acetic anhydride and metaboric acid in about a 3:2 molar ratio; the rate of introduction of said acetic anhydride and said metaboric acid being such that the temperature of the liquid mass in said reaction zone is maintained to within the range 135°–140° C. and below the temperature of reflux of said mixture; withdrawing boron acetate and acetic acid from said zone; and recovering the withdrawn boron acetate.

References Cited in the file of this patent

Pictet et al.: Berichte, vol. 36, pg. 2219.
Cook et al.: J. Chem. Soc. (London), pg. 3127 (1950).